(No Model.)

J. R. ROBINSON.
WAGON BRAKE.

No. 395,516. Patented Jan. 1, 1889.

WITNESSES:

INVENTOR:
J. R. Robinson
BY Munn & Co.
ATTORNEYS.

UNITED STATES PATENT OFFICE.

JAMES R. ROBINSON, OF CORNELIA, ASSIGNOR OF TWO-THIRDS TO GOODLET CROW AND CHARLES CROW, BOTH OF SHAWNEE MOUND, MISSOURI.

WAGON-BRAKE.

SPECIFICATION forming part of Letters Patent No. 395,516, dated January 1, 1889.

Application filed August 13, 1888. Serial No. 282,511. (No model.)

*To all whom it may concern:*

Be it known that I, JAMES R. ROBINSON, of Cornelia, in the county of Johnson and State of Missouri, have invented a new and Improved Wagon-Brake, of which the following is a full, clear, and exact description.

This invention relates to wagon-brakes, and has for its object to provide a wagon-brake which may be easily adjusted and will be effective in operation.

The invention consists in a wagon-brake constructed and arranged as hereinafter described and claimed.

Reference is to be had to the accompanying drawings, forming a part of this specification, in which similar figures of reference indicate corresponding parts in all the views.

Figure 1:
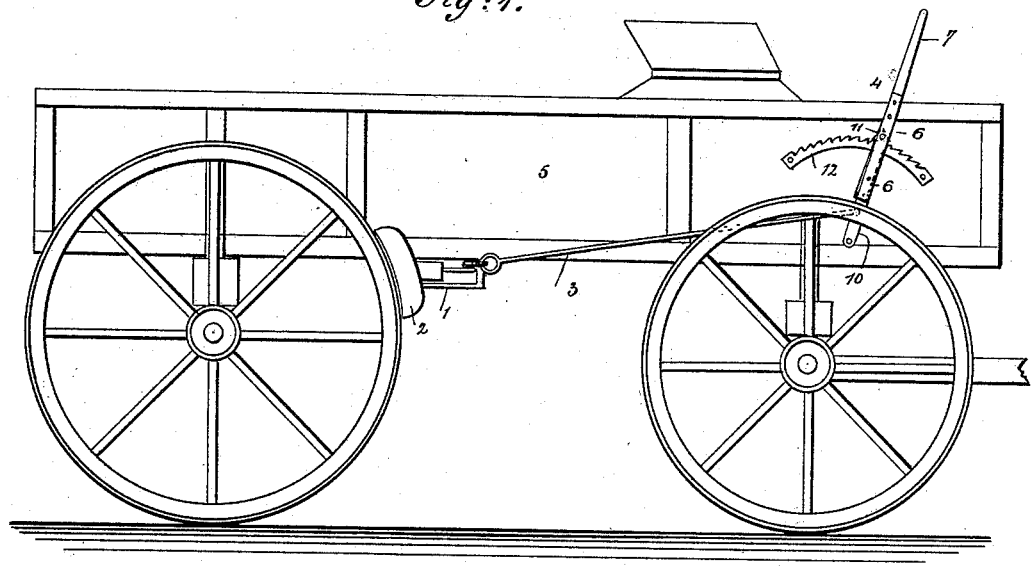
Figure 2:
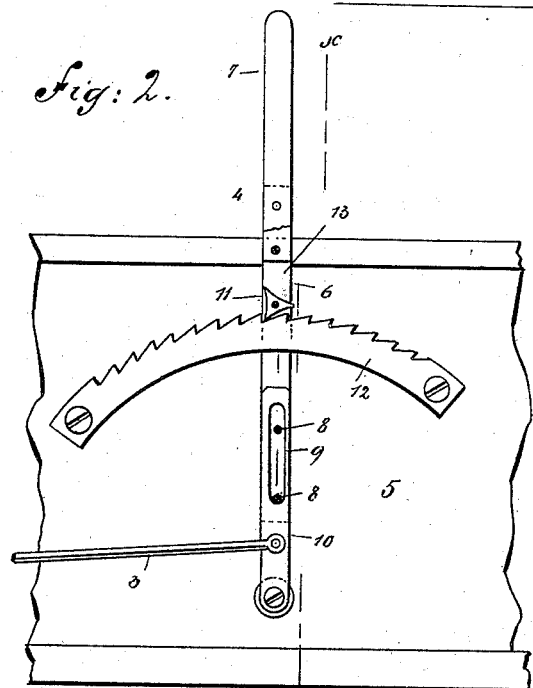
Figure 3:
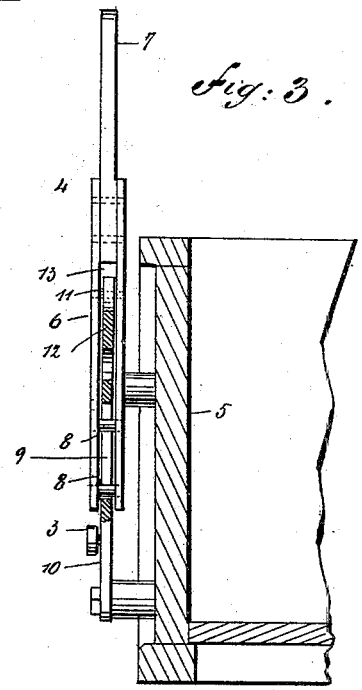

Figure 1 is a side view of a wagon, showing the invention applied thereto. Fig. 2 is an enlarged view of the lever-handle-operating mechanism, with parts broken away; and Fig. 3 is a transverse section on the line $x$ $x$ of Fig. 2.

In carrying out this invention a sliding brake-frame, 1, having brake-shoes 2, may be employed, pivotally connected by a rod, 3, with a lever, 4, pivoted to the side of a wagon, 5, adjacent to the driver's seat. The lever 4 is formed with the forked portion 6, extending downward from the handle 7, and having the cross-pins 8 8', projecting through a vertical slot, 9, in the lower portion, 10, of the lever 4. In the upper portion of slot 13 is pivoted a three-pointed pawl, 11, located above a curved rack-bar, 12, secured to the sides of the wagon 5 and extending through the slot 13, formed by forked portion 6. By means of this construction, when the brake is engaged the lower end of the forked portion 6 has been thrown back, as shown in Fig. 1, by the forward pressure which has been brought to bear on the handle 7, and cross-pin 8 presses against the forward side of slot 9 and the cross-pin 8' against the rear side, thereby making the brake reliable and effective.

In disengaging the brake, upon pulling back on handle 7 the pressure of pin 8' is relieved and the forked portion 6 is caused to rise slightly by means of the points of the pawl 11 as the pawl 11 revolves backward.

In operation the lever 4 may be moved forward to brake the wagon without lifting the forked portion 6, the pawl 11 sliding over the rack-bar 12. Upon letting go of the handle 7 the pawl 11 will immediately engage rack-bar 12 and hold the lever 4 against backward movement. To release the brake, it is simply necessary to move the lever 4 back, when the pawl 11 will revolve over rack-bar 12, thereby releasing the brake.

By means of this invention a simple, durable, and effective brake is provided.

While I have set forth a specific construction of parts, I do not intend to limit myself thereto, as the parts may be varied without departing from the essential features of the invention.

Having thus described my invention, what I claim as new, and desire to secure by Letters Patent, is—

1. A wagon-brake constructed with a brake, a lever-handle formed in two parts, the lower part pivoted to the wagon and the upper part having a pawl and a vertically-sliding connection with the lower part, a rack-bar on the wagon adapted to engage the pawl, and a connecting-rod pivoted to the brake and to the lower portion of the lever-handle, substantially as shown and described.

2. A wagon-brake constructed with a brake, a lever-handle pivoted to the wagon and formed in two parts, the upper part having a rotary pawl and being vertically movable on the lower part, a rack-bar with which the pawl is adapted to engage, and a connecting-rod pivoted to the brake and to the lower part of the lever-handle, substantially as shown and described.

3. A wagon-brake constructed with a brake, a lever, 4, pivoted to wagon 5 and formed with lower portion, 10, having vertical slot 9, and an upper portion with a handle, 7, having forked portion 6, and cross-pins 8, projecting through slot 9 in lower portion, 10, curved rack-bar 12, extending through forked portion 6, three-pointed pawl 11 in forked portion 6, located above rack-bar 12, and connecting-rod 3, pivoted to the brake and the lower portion, 10, of lever 4, substantially as shown and described.

JAMES R. ROBINSON.

Witnesses:
GOODLET CROW,
G. W. PATTON.